United States Patent
Macovski

[15] 3,641,255
[45] Feb. 8, 1972

[54] NONINTERACTING LENS SYSTEM FOR A COLOR ENCODING CAMERA

[72] Inventor: Albert Macovski, Palo Alto, Calif.
[73] Assignee: RCA Corporation

[22] Filed: Apr. 17, 1970
[21] Appl. No.: 29,448

[52] U.S. Cl.......................178/5.4 ST, 350/162 SF, 350/169
[51] Int. Cl.......................................H04n 9/06, G02b 27/12
[58] Field of Search..................178/5.4 ST; 350/162 SF, 169

[56] References Cited

UNITED STATES PATENTS

| | | | |
|---|---|---|---|
| 2,733,291 | 1/1956 | Kell | 178/5.4 ST |
| 3,002,051 | 9/1961 | Tait | 178/5.4 ST |
| 3,378,633 | 4/1968 | Macovski | 178/5.4 ST |
| 3,530,233 | 9/1970 | Chai et al. | 178/5.4 ST |

*Primary Examiner*—Robert L. Griffin
*Assistant Examiner*—John C. Martin
*Attorney*—Eugene M. Whitacre

[57] ABSTRACT

In a color camera utilizing a color encoding strip filter arrangement in the optical path to separate light from an object into its component colors, an imaging system includes a noninteracting cylindrical lens array to image the encoding filter strips onto a photosensitive medium without the use of a relay lens.

11 Claims, 6 Drawing Figures

INVENTOR.
Albert Macovski
BY
Eugene M. Whitacre
ATTORNEY

NONINTERACTING LENS SYSTEM FOR A COLOR ENCODING CAMERA

BACKGROUND OF THE INVENTION

This invention relates to the optical system of a color camera, and more particularly, to a shadowing system for imaging color encoding filter strips onto a photosensitive medium.

It is known in the art that a color encoding filter may be placed in the optical path of a camera to encode the light from an object in terms of its component colors, which encoded light may then be recorded on black and white film for subsequent decoding to reproduce an image of the object in color, or the encoded light may be imaged onto the photosensitive electrode of a black and white television camera pickup tube for generating color representative video signals which may be decoded and used to reproduce a color image of the object in a television receiver.

The color encoding filter may comprise a first grating of alternate and parallel transparent and colored strips of a first color and a second grating superimposed over the first and comprising alternate and parallel transparent and colored strips of a second color. The colored strips may be of primary colors such as red and blue or they may be of subtractive colors such as cyan and yellow, for example. The latter type is more efficient from the point of view of overall light transmission and in that the entire filter area may be used for color encoding as well as for luminance or brightness signal generation.

A color encoding filter of the type having subtractive color strips may be similar to that disclosed in U.S. Pat. No. 3,378,633 issued Apr. 16, 1968, to Albert Macovski. Such a filter comprises a first grating of alternate cyan and transparent strips and a second grating of alternate yellow and transparent strips, one grating being superimposed over the other with the strips of the first grating at an angle of approximately 45° relative to the strips of the second grating. In the patented filter the width of the strips of both filters are substantially equal and have a line density of approximately 500 strip pairs per inch (a strip pair consisting of one colored and one transparent strip) imaged onto a one-half inch wide photosensitive electrode of a television camera pickup tube, for example. The cyan and transparent strips of the first grating are disposed vertically, for example, i.e., perpendicular to the direction in which the electrode is scanned by an electron beam, and the yellow and transparent strips of the second grating are disposed at an angle of approximately 45° to the strips of the first grating and to the scanning direction of the electron beam. The scansion of the photosensitive electrode of such a camera tube at the rate established as standard in the United States by the Federal Communications Commission produces at the output of the camera tube a 3.5 MHz. carrier wave modulated in amplitude by the blue color representative signal and a 5.0 MHz. carrier wave modulated in amplitude by the red representative signal. The luminance or brightness information is represented by the signal produced in the output of the camera tube that is derived from the average light transmitted by the encoding filter onto the photosensitive electrode of the camera tube. The composite signal produced in the output of the camera tube is processed to develop separate luminance (Y) and red and blue color difference signals (R–Y) and (B–Y), respectively.

The light from a subject is filtered by a color encoding filter, such as that described and disclosed in the Macovski patent, and then impinges upon the photosensitive electrode of the camera pickup tube, which may be a vidicon, for example, after passing through the faceplate of the tube. It is desirable that the color encoding strip pattern be sharply imaged on the photosensitive electrode in order to produce maximum modulation of each of the encoded color signals. In the case of the cyan-transparent grating of the encoding filter disclosed by Macovski, for example, it is desirable that the light passing through the transparent strips be prevented from impinging upon those areas of the photosensitive electrode located behind the cyan strips in order that the carrier wave, produced in the output of the camera pickup tube by the electron beam scansion of the electrode, be modulated only by the presence or absence of red light from the subject. The filter gratings will be sharply imaged on the photosensitive electrode if the light rays passing through the encoding filter strips are collimated, i.e., are parallel or substantially so. If the camera lens is stopped down to a relatively small aperture, *f*22 or *f*32, for example, the light passing through the aperture will be substantially collimated and the encoding filter strips will be sharply focused on the photosensitive electrode of the camera tube. Frequently, however, it is desirable to increase the aperture size of the camera lens to obtain sufficient illumination of the photosensitive electrode or to achieve other effects. At large aperture sizes of the camera lens, such as *f*4.5 for example, the rays of light passing through the lens will not be collimated (i.e., parallel) and the encoding filter strips will not be imaged sharply onto the photosensitive electrode, thereby resulting in a loss of modulation of the color encoded signals as previously described.

In the past, one approach to imaging the encoding filter strips onto the photosensitive electrode of the camera tube has been to insert a relay lens in the optical path between the color encoding filter and the photosensitive electrode. In such an arrangement, light from the subject is imaged onto the color encoding filter and the relay lens serves to reimage the combination of the subject and the encoding filter strips onto the photosensitive electrode of the camera tube. Hence, in a color encoding camera system utilizing a relay lens to focus the color encoding filter strips onto the photosensitive electrode of the camera tube, it is necessary that the encoding filter be in an image plane. Thus, any dust on the filter or any imperfection thereof would be in focus at the photosensitive electrode and would usually appear undesirably in the image produced from the camera generated signals. Also, a relay lens adds to the cost, size and weight of the optical system used with the camera.

In a shadowing system of the type disclosed in U.S. Pat. No. 2,733,291 granted Jan. 31, 1956 to R. D. Kell, a shadowing grating having strips of primary colors and a separate transparent area for passing luminance representative light is disposed in the optical path ahead of (i.e., between the subject and) a color encoding filter having strips of subtractive primary colors. The use of such a shadowing grating permits a given primary color to be encoded only over a portion of the total filter area, thereby resulting in decreased light transmission efficiency, and the separate transparent area of the shadowing grating permits the luminance signal representative light to appear over the entire encoding filter, thereby reducing the modulation of the separate primary color signals. Also, the color encoding filter must have a strip density high enough to resolve the subject derived light into a minimum number of elements.

A shadowing arrangement which does not use a relay lens and has a relatively high light efficiency is disclosed in a copending application of Hugh F. Frohbach et al., Ser. No. 798,677, filed Feb. 12, 1969, and entitled "Shadowing System for a Color Encoding Camera." Such an arrangement uses both coarse and fine color encoding filters and a fine phase or density grating in a shadowing arrangement to form a color encoding pattern on the photosensitive electrode of a camera tube. In such an arrangement, the strips of the coarse color encoding filter act as an effective lens aperture to limit the angle of the light rays passing therethrough so that the fine grating may be shadowed onto the photosensitive camera tube electrode. If the fine grating is of the density type, there is some loss in light efficiency because no light is passed by its opaque strips. Similarly, if the fine grating is of the color encoding variety, some light is absorbed by its colored strips, thereby decreasing somewhat the light transmission efficiency of the shadowing arrangement.

Another shadowing arrangement which does not require a relay lens and which has an even higher light efficiency than that of the copending Frohbach et al. application is disclosed in a copending application of Hugh F. Frohbach, Ser. No. 798,678, filed Feb. 12, 1969, and entitled "Lens Array Imaging System for a Color Encoding Camera." In this system the coarse color encoding filter is imaged onto the photosensitive electrode of the camera tube by an array of small spherical lens elements aligned with the encoding filter strips. The use of spherical lens arrays in place of conventional cylindrical lens arrays permits the use of lens arrays with two or more angularly disposed encoding filter grids at other than a 90° angle to each other because the spherical lens array greatly reduces the interaction caused by the use of cylindrical lens arrays. However, it is more difficult and costly to produce suitable spherical lens arrays than the conventional cylindrical lens arrays.

When more than one set of color encoding filter strips is used in any mutual relationship except a 90° one, the cylindrical lens elements associated with one of the sets of encoding filter strips interact with the cylindrical lens elements associated with other sets of filter strips, thereby reducing the focusing ability of one another. The net result is a poorly resolved or low modulation image of the color encoding filter which is formed on the photosensitive electrode of the camera tube.

It, therefore, is an object of the present invention to provide an imaging system for a color encoding camera which has a high-light efficiency and which enables the formation on a photosensitive medium of a high-resolution encoding filter pattern by a noninteracting lens array without using a relay lens.

SUMMARY OF THE INVENTION

In a color encoding camera system including a photosensitive medium onto which a color encoding filter pattern is to imaged by apparatus including two arrays of cylindrical lens elements aligned respectively with two grids of the encoding filter, each of the lens arrays has a distinctive dispersion characteristic and the arrays are separated by optical coupling means which has such a dispersion characteristic in relation to the dispersion characteristics of the two lens arrays as to substantially obviate interaction between the lens arrays.

For a more specific disclosure of the invention and its mode of operation reference may be had to the following detailed description of an illustrative embodiment thereof which is given in conjunction with the accompanying drawing, of which:

Figure 1:
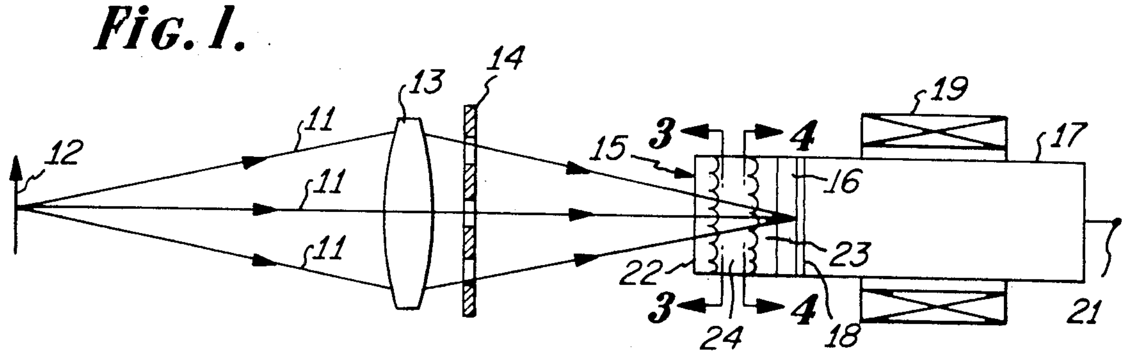
FIG. 1 is a diagrammatic representation from the top of the optical components of a color encoding camera system including imaging apparatus in accordance with the invention.
Figures 2, 3, 4:
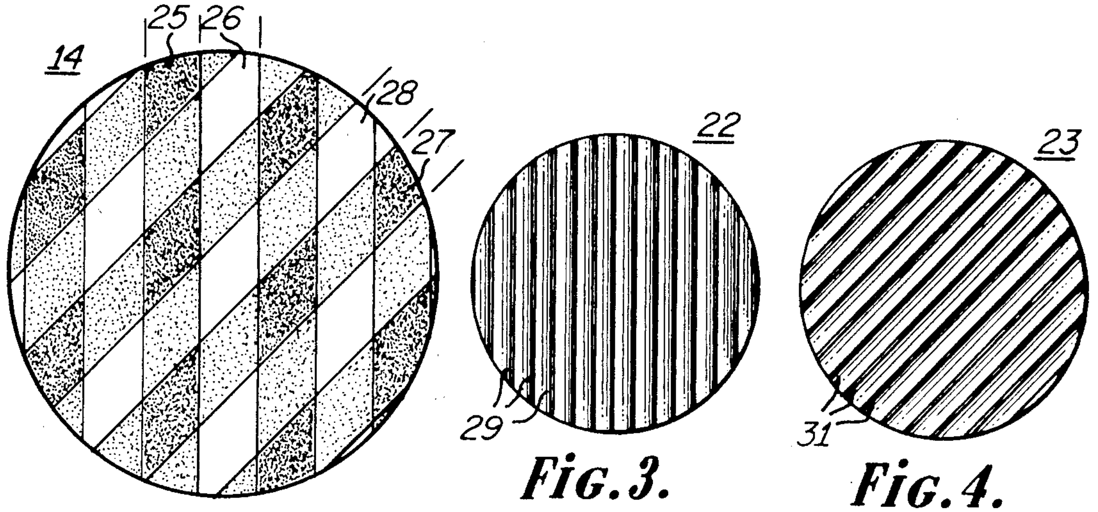
FIG. 2 illustrates a typical color encoding strip filter which may be used in the system of FIG. 1.
FIG. 3 illustrates a vertical cylindrical lens array used for imaging the vertical color encoding strips of the filter of FIG. 2.
FIG. 4 illustrates an angular cylindrical lens array used for imaging the angular color encoding strips of the filter of FIG. 2.
Figure 6:
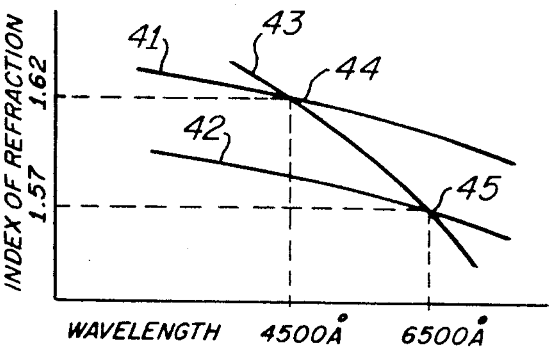
Figure 5:
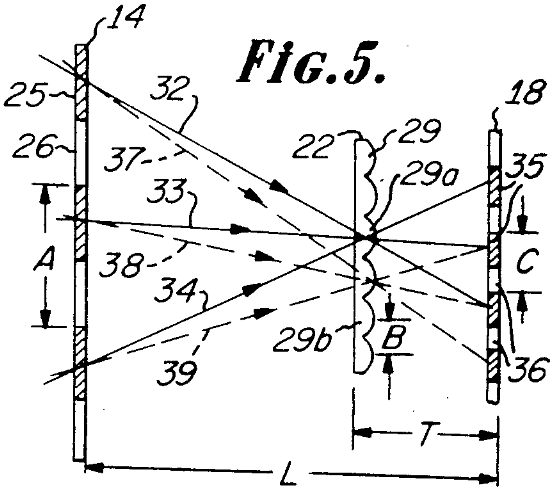

FIG. 5 illustrates the manner in which one color encoding grid of the filter of FIG. 2, the corresponding cylindrical lens array of FIG. 3 or FIG. 4 and the photosensitive electrode of the camera tube of FIG. 1 are arranged relative to one another so as to image the filter grid onto the electrode; and FIG. 6 is a graph showing the interrelationship of the two cylindrical lens arrays of FIGS. 3 and 4 and the optical coupling means by which they are separated as shown in FIG. 1.

DESCRIPTION OF THE INVENTION

In FIG. 1 typical light rays 11, derived from an object 12, pass through, in the order named a camera objective lens 13, a color encoding strip filter 14, lenticular imaging apparatus 15, and the faceplate 16 of a camera pickup tube 17 to form an image of the object on a photosensitive electrode 18 of the camera tube. The camera tube 17 may be of the photoconductive type such as a vidicon, but it is to be understood that other types of pickup tubes may be used in the practice of this invention. The electrode 18 is scanned by an electron beam (not shown) which is deflected in a conventional manner by means including a suitably energized deflection yoke 19, thereby developing color encoded video signals at an output terminal 21 that are representative of the object 12, substantially as taught in the Macovski patent previously referred to. The lenticular imaging apparatus 15 comprises two cylindrical lens arrays 22 and 23 and an intervening optical coupling means 24, the respective properties of which will presently be described.

In FIG. 2 a representative color encoding filter 14 comprises a first grid of alternate cyan strips 25 and transparent strips 26, and a second grid of alternate yellow strips 27 and transparent strips 28. As illustrated, one strip grid is superimposed upon the other with the strips 25–26 of the first grid arranged vertically and the strips 27–28 of the second grid arranged at about a 45° angle to the first grid strips. The strips of both grids are of substantially equal widths. The cyan strips 25 block red light and pass green and blue light so that the first grid strips 25–26 encode the red light from the object. In a similar manner, the yellow strips 27 block blue light and pass green and red light so that the second grid strips 27–28 encode the blue light from the object. Because the respective colored strips pass light of two primary colors and block light of the third primary color, the encoding of light of one color by one filter grid does not interfere with the encoding of light of the other color by the other filter grid.

The encoded color representative video signals are derived from the output terminal 21 of FIG. 1 as sidebands of a carrier wave, the frequency of which is determined by the number of pairs of colored and transparent strips traversed by the electron scanning beam over a given area of the photosensitive electrode 18 of the camera tube 17 in one line scanning period. A relatively high carrier frequency will be developed by the scansion of photoelectrode areas aligned with the vertically disposed strips 25–26 of the first grid of the encoding filter 14. Also, a lower carrier frequency will be developed by the scansion of those areas of the photosensitive electrode 18 aligned with the obliquely disposed strips 27–28 of the second encoding filter grid. Thus, in the illustrated encoding filter arrangement of FIG. 2, the red component of the light derived from the object 12 is represented by the amplitude modulation of the sidebands of the relatively high-frequency carrier wave and the blue component of the object derived light is represented by the amplitude modulation of the sidebands of the lower frequency carrier wave. The luminance or brightness component of the subject derived light comprises the average light transmission of the two grids of the encoding filter 14 and the representative luminance signal developed at the output terminal 21 corresponds to the average value of the color carrier waves. The luminance and encoded color signals produced at the output terminal 21 of the camera tube 17 may be coupled to a processing network such as that described in the previously mentioned Macovski patent, for example, in which the signals are separated by suitable filters and combined in a manner to yield a luminance signal Y and red and blue color difference signals (R–Y) and (B–Y).

As previously described, the object derived light rays, of which the rays 11 are typical, upon emerging from the encoding filter 14, traverse the cylindrical lens arrays 22 and 23 of the imaging apparatus 15. The details of these arrays are shown in FIGS. 3 and 4 which are sectional views of the imaging apparatus taken on the lines 3–3 and 4–4, respectively, of FIG. 1. The lens elements 29 of the array 22 are aligned with the red light encoding strips 25–26, etc., of the filter 14. Similarly, the lens elements 31 of the array 23 are aligned with the blue light encoding strips 27–28 etc., of the filter. The pitch of the lens elements 29 is less than the pitch of the filter strips 25–26, etc., and the pitch of the lens elements 31 is less than that of the filter strips 27–28, etc. In order for the encoding filter 14 and the lens arrays 22 and 23 to be in a collimating relationship with one another relative to the photosensitive electrode 18 of the camera tube 17 it is necessary that the pitches of the lens arrays and the corresponding strips of the filter grids have the relationship illustrated in FIG. 5.

There is shown in FIG. 5 the desired relationship between the vertical strips 25–26, etc., of the red light encoding grid of the filter 14, the vertical cylindrical lens elements **29–29*a*–29*b*, etc., of the array 22 and the photosensitive electrode 18 of the camera tube 17. It is to be understood that FIG. 5 also is representative of the desired relationship between the oblique strips 27–28, etc., of the blue light encoding grid of the filter 14, the cylindrical lens elements 31, etc., of the array 23 and the photosensitive camera tube electrode 18. The color encoding filter 14 is located at a distance $L$ from the photosensitive electrode 18 and the cylindrical lens array 22 is disposed at a distance T from the electrode. The pitch of the cyan-transparent strips 25–26 is A and the pitch of the lens elements 29 is B. In order for the encoding filter 14 and the lens array 22 to be in a light collimating relationship with one another and with the photosensitive electrode 18, the following relationship must exist: $A/B = L/T$. With this collimating relationship the pitch C of the color encoding strip pattern imaged onto the photosensitive electrode is given by the expression $1/C = 1/B - 1/A$. Therefore, it is seen that the frequency of the signal developed by scanning the image of the color encoding strip pattern on the photosensitive electrode 18 is proportional to the difference between the line "-frequencies" (i.e., reciprocal of pitch) of the cylindrical lens array 22 and the color encoding filter 14**. Such an arrangement enables the color encoding filter to be made with relatively wide strips which makes the filter easier and less costly to manufacture than one having a higher strip density Also, in a filter having a relatively small number of strips there is a relatively low probability of defects therein.

In FIG. 5 rays of object derived light indicated by the solid lines 32, 33 and 34 are shown passing through three of the cyan strips 25 of the color encoding filter 14 and a single cylindrical lens element **29*a* of the lens array 22. The lens element 29*a* thus forms an image of substantially the entire color encoding filter 14 on the photosensitive electrode 18. The imaged cyan strips are represented by the shaded areas 35 and the imaged transparent strips are represented by the unshaded areas 36 on the electrode 18. Other rays of light indicated by the broken lines 37, 38 and 39 also pass through the cyan strips 25 of the encoding filter 14 and through another cylindrical lens element 29*b* of the lens array 22. This lens element also forms an image of the color encoding filter 14 on the photosensitive electrode 18**.

From the foregoing description of FIG. 5 it can be seen that each individual cylindrical lens element 29 of the lens array 22 forms an image of the color encoding filter pattern on the photosensitive electrode 18 of the camera tube of FIG. 1, the images produced by the respective lens elements being mutually superimposed on the photosensitive electrode. Consequently, even if there were to be defects in, or dust on, an individual lens element, or even if a lens element were to be missing, there would be little adverse effect on the encoding filter pattern shadowed onto the photosensitive electrode 18 because of the many superimposed images created by all of the lens elements 29 of the lens array 22. The use of the lens array 22 in conjunction with the red light encoding grid of the filter 14, and a similar use of the lens array 23 in conjunction with the blue light encoding grid of the filter 14, constitutes an imaging system having a greater light transmission efficiency than one employing a fine pitch color encoding filter as described in the previously mentioned copending Frohbach et al., application. This results from the fact that the entire area of the combined lens arrays 22 and 23 transmits light and there is no absorption of light as in the case of a color encoding filter or a density grating.

In the imaging apparatus of the present invention as illustrated in FIGS. 1, 2, 3 and 4 advantage is taken of the use of the separate lens arrays 22 and 23 for the respective imaging on the photosensitive camera tube electrode 18 of the two differently colored encoded components of the light derived from the object 12 and the encoding filter 14. In order to take such advantage, the imaging apparatus 15 comprises, in addition to the cylindrical lens arrays 22 and 23, light coupling means 24 disposed between the lens arrays, the respective curved elemental lenticular sides of which abut opposite sides of the coupling means. The two lens arrays 22 and 23 and the optical coupling means 24, respectively, are made of materials having light dispersion characteristics such as those illustrated in FIG. 6.

In FIG. 6 the curves 41 and 42 represent the dispersion characteristics of the lens arrays 22 and 23 respectively, and the curve 43 represents the dispersion characteristic of the coupling means 24. It is to be noted that the curves 41 and 43 intersect at a point 44, indicating that for light having a wavelength of approximately 4,500 angstrom units (blue), the lens array 22 and the coupling means 24 have substantially the same index of refraction (viz, about 1.62). Similarly, the intersection of the curves 42 and 43 at a point 45 indicates that, for light having a wavelength of approximately 6,500 angstrom units (red), the lens array 23 and the optical coupling means 24 have substantially the same index of refraction viz about 1.57).

The significance of the refractive index matching of the coupling means 24 with the lens arrays 22 and 23 at the respective wavelengths of the blue and red object derived light is that the particular lens array that is designed to image light of one color on the photosensitive camera tube electrode 18 has substantially no imaging effect for the object derived light of the other color. For example, at the 4,500 angstrom unit wavelength of blue light, the curved lenticular side of the lens array 22 effectively disappears because of the refractive index matching of this lens array and the coupling means 24 at the point 44 of FIG. 6. The lens array 22, thus, has no imaging effect upon the blue object derived light. This array, however, does have an imaging effect upon the red object derived light because, at the 6,500 angstrom unit wavelength of the red light, its refractive index is materially different from that of the optical coupling means 24. Similarly, the lens array 23 and the coupling means 24 have substantially the same index of refraction, indicated at the point 45 of FIG. 6, at the 6,500 angstrom unit wavelength of red light, and materially different refractive indices at the 4,500 angstrom unit wavelength of blue light. The lens array 23, thus, images blue, but not red, light upon the photosensitive camera tube electrode 18 of FIG. 1. Hence, the cylindrical lens elements 29 and 31, respectively, of the arrays 22 and 23 may be placed at substantially any desired angle relative to one another without incurring any interaction between them.

The lens arrays 22 and 23 and the optical coupling means 24 may be made of a number of different glass, plastic, and liquid materials having the desired light dispersion characteristics such as those indicated in FIG. 6. One representative group of materials which may be used for the imaging apparatus of this invention is set forth in the following table.

| Imaging element | Material | Refractive index 4,500° A (blue) | Refractive index 6,500° A (red) |
|---|---|---|---|
| Lens array 22 | Barium crown 611glass. | 1.6245 | 1.6078 |
| Coupling means 24 | Aniline $C_6H_5NH_2$ liquid. | 1.6204 | 1.5793 |
| Lens array 23 | Barium crown 574 glass. | 1.5871 | 1.5715 |

It is to be noted that the refractive indices of the lens array 22 and the coupling means 24, respectively, are substantially the same at the wavelength of blue light and the refractive indices of the lens array 23 and the coupling means 24, respectively, substantially match one another at the wavelength of red light.

In the fabrication of the lens arrays 22 and 23, which may be achieved by well known photographic techniques, the radii of curvature of the lenticular elements are functions both of the focal distances to the photosensitive camera tube electrode 18 and the respective indices of refraction of the particular array and the optical coupling means 24 at the wavelength of the light encoded by the associated grid of the filter 14 as represented by the expression $$f = R/(n_1 - n_m)$$

where $R$ is the radius of curvature, $n_1$ is the refractive index of the lens array material and $n_m$ is the refractive index of the coupling means 24. Thus, the required radius of curvature ($R_r$) of each cylindrical lens element of the array 22 is given by the expression $$R_r = f(n_1 - n_2)\text{red}$$

where $n_1$ and $n_2$, respectively, are the refractive indices of the array 22 and of the coupling means 24 at the wavelength of red light and $f$ is the focal length of a lens element which is equal approximately to the thickness of the faceplate 16 of the camera tube 17, assuming the imaging apparatus 15 to be mounted on the outside of the tube faceplate. Likewise, the radius of curvature ($R_b$) of each cylindrical lens element of the array 23 is given by the expression $$R_b = f(n_3 - n_2)\text{blue}$$

where $n_2$ and $n_3$, respectively, are the refractive indices of the array 23 and of the coupling means 24 at the wavelength of blue light and $f$ is equal approximately to the thickness of the camera tube faceplate 16. From the data of the foregoing table it is seen that $R_r$ is positive and $R_b$ is negative which indicates that the cylindrical lens elements 29 of the array 22 are convex toward the coupling means 24 and the elements 31 of the array 23 are concave toward the coupling means.

As shown in FIG. 1 the cylindrical lens arrays 22 and 23 are mounted in contact with opposite sides of the optical coupling means 24, thereby forming a unitary structure of the imaging apparatus. Such a structure has the advantage, in addition to the formation of a noninteracting lenticular imaging apparatus, of producing less diffusion of the light representing object information than is produced by conventional lens structures because, at the center of the visible spectrum, each lens element has an effectively increased radius of curvature and, hence, reduced "lens action," thereby reducing any diffusion of the luminance information.

The described imaging apparatus of the invention may be used in other than the herein disclosed embodiment, such as with a film camera for recording encoded colored light information on a panchromatic film, for example. Accordingly, the term "photosensitive medium" as used herein may be defined as an electrode, a film or other surface which is susceptible of having an initial state thereof altered in response to light projected thereon, whereby to record the information represented by the projected light. Also, it should be understood that the imaging apparatus may be used with other types of strip light encoding filters having two or more grids of encoding strips, so long as the cylindrical lens elements of the plurality of lens arrays are aligned with their associated filter strips in the specified light collimating relationship and have the requisite light dispersion characteristics specified herein.

I claim:

1. In a color encoding camera system including a photosensitive medium, a lens system for projecting light from an object onto said photosensitive medium, and a color encoding filter including first and second grids of first and second colored light transmissive strips, respectively, each grid having a relatively coarse pitch and positioned in the optical path between said lens system and said photosensitive medium, apparatus for imaging onto said photosensitive medium object-derived light separated into components of first and second spectral ranges encoded by the first and second colored light transmissivity of said first and second filter grids, respectively, said imaging apparatus comprising:

first and second arrays of cylindrical lens elements, each array having a distinctive dispersion characteristic and a smaller pitch than said first and second grids and arranged in the optical path between said photosensitive medium and said color encoding filter in light collimating relationship with said respective first and second filter grids and with the lens elements of said first array parallel to the light transmissive strips of said first filter grid and the lens elements of said second array parallel to the light transmissive strips of said second filter grid; and optical coupling means located between said first and second cylindrical lens arrays and having an index of refraction characteristic which is different for colored light passed by said first and second color encoding grids and which matches the respective indices of refraction of said first and second lens arrays for each of the respective colors passed by said grids such as to substantially obviate interaction between said first and second lens arrays.

2. In a color encoding camera system, imaging apparatus as defined in claim 1, wherein:

the dispersion characteristics of said first and second lens arrays and of said optical coupling means are such that, said first lens array and said optical coupling means have substantially the same index of refraction at the wavelength of light encoded by said second filter grid and different indices of refraction at the wavelength of light encoded by said first filter grid, and said second lens array and said optical coupling means have substantially the same index of refraction at the wavelength of light encoded by said first filter grid and different indices of refraction at the wavelength of light encoded by said second filter grid.

3. In a color encoding camera system, imaging apparatus as defined in claim 2, wherein:

the arrangement of said first and second lens arrays and said optical coupling means is such that said object-derived light, after passing through said color encoding filter, passes through said first lens array, said optical coupling means and said second lens array in the order named to said photosensitive medium.

4. In a color encoding camera system, imaging apparatus defined in claim 3, wherein:

each cylindrical element of each of said first and second lens arrays has a curved side; and said first and second lens arrays are disposed with the curved sides of their respective lens elements facing one another and said optical coupling means.

5. In a color encoding camera system, imaging apparatus as defined in claim 4, wherein:

the curved sides of the lens elements of said first lens arrays are convex toward said optical coupling means; and the curved sides of the lens elements of said second lens array are concave toward said optical means.

6. In a color encoding camera system, imaging apparatus as defined in claim 5, wherein:

the radius of curvature of the curved sides of the lens elements of said first lens array is a function of the focal distance from said first lens array to said photosensitive medium and of the respective indices of refraction of said first array and said optical coupling means at the wavelength of light encoded by said first filter grid; and the radius of curvature of the curved sides of the lens elements of said second lens array is a function of the focal distance from said second lens array to said photosensitive medium and of the respective indices of refraction of said second array and said optical coupling means at the wavelength of light encoded by said second filter grid.

7. In a color encoding camera system, imaging apparatus as defined in claim 6, wherein:

the respective indices of refraction of said first and second lens arrays and said optical coupling means are greater at the wavelength of light encoded by said second filter grid than at the wavelength of light encoded by said first filter grid.

8. In a color encoding camera system, imaging apparatus as defined in claim 7, wherein:

the index of refraction of said second lens array is less than the respective indices of refraction of said first lens array and said optical coupling means at the wavelength of light encoded by said first filter grid; and the index of refraction of said first lens array is greater than the respective indices of refraction of said second lens array and said optical coupling means at the wavelength of light encoded by said second filter grid.

9. In a color encoding camera system, imaging apparatus as defined in claim 8, wherein:

said first and second lens arrays are mounted in contact with opposite sides of said optical coupling means, thereby forming a unitary structure of said imaging apparatus.

10. In a color encoding camera system, imaging apparatus as defined in claim 9, wherein:

said photosensitive medium is the photosensitive electrode of a television camera pickup tube; and the unitary structure of said imaging apparatus is mounted on the faceplate of said pickup tube.

11. In a color encoding camera system, imaging apparatus as defined in claim 10, wherein:

the unitary structure of said imaging apparatus is mounted on the outside of said pickup tube faceplate.

* * * * *